United States Patent [19]
Parrillo

[11] Patent Number: 5,239,583
[45] Date of Patent: Aug. 24, 1993

[54] METHOD AND APPARATUS FOR IMPROVED SECURITY USING ACCESS CODES

[76] Inventor: Larry A. Parrillo, 15312 Dearborn St., Sepulveda, Calif. 91343

[21] Appl. No.: 683,600

[22] Filed: Apr. 10, 1991

[51] Int. Cl.$^5$ .............................................. H04L 9/32
[52] U.S. Cl. ........................................ 380/23; 380/4; 380/24; 380/25; 340/825.31; 340/825.34; 235/379; 235/380; 235/382
[58] Field of Search .................................. 380/23-25, 380/4; 235/379, 380, 382; 340/825.31, 825.34

[56] References Cited

U.S. PATENT DOCUMENTS 4,837,422 6/1989 Dethloff et al. .................... 235/380

OTHER PUBLICATIONS

Meyer et al, *Cryptography: A Guide for the Design and Implementation of Cryptographic Systems;* (John Wiley & Sons, 1982; pp. 499-507).
*Maps: Manual of the Automated Patent System;* (Planning Research Corp., Oct. 1987; pp. I-19 and I-135 Through I-138).

*Primary Examiner*—Bernarr E. Gregory
*Attorney, Agent, or Firm*—Ladas & Parry

[57] ABSTRACT

An improvement in structure and credit account access security employing method and means for ensuring that repeating an exact access code which was successful in accessing the account will be unsuccessful at the next or subsequent tries. The user enters a PIN code in accordance with a prescribed, but variable, sequence, the sequence being different for each transaction from the previous transaction. The user inputs the PIN by entering a sequence of alphanumeric symbols in accordance with a prescribed "start" sequence of symbols for recognition as a proper 4-digit PIN for a first transaction. The user must enter a new PIN to access the same account on subsequent tries. Preferably, the sequence of symbols comprising the PIN has only one symbol different from the "start" sequence for recognition as a proper PIN for a second transaction and the third transaction may require yet a third sequence of alphanumeric symbols comprising a third PIN. As many different PINs as desired can be accommodated within reasonable limits.

19 Claims, 4 Drawing Sheets

METHOD AND APPARATUS FOR IMPROVED SECURITY USING ACCESS CODES

BACKGROUND OF THE INVENTION

1. Field of the Invention

This invention relates to the field of security access to structures, credit accounts, and the like, especially credit card accounts, and concerns an improved method and apparatus for improving the security of such structures and accounts by significantly restricting unauthorized access yet keeping legitimate accessing simplistic for an authorized user. Although the invention can be employed for use with both structures and credit accounts, it will be described primarily in connection with credit accounts. The extension to structures, being simpler in concept, will be readily evident.

2. Brief Description of the Prior Art

In this specification, the term "credit account" will be used as a generic term for any kind of account that is accessible to a user by entering "account information" and an "access code". Such credit accounts include, but are not to be limited to, credit card accounts and telephone credit card accounts. An example of "account information" is the telephone number of the user of a telephone credit card or calling card. When making a call to be charged to a telephone credit account, the user dials a 0, the area code he or she is calling, and the 7-digit telephone number of the called party. The user is then prompted to input his or her "account information" which in this case is the user's phone number (the one to be charged) followed by a 4-digit "access code" or user identification code, more commonly known as a personal identification number or PIN.

In this discussion, the phrases "access code", "user identification code", "personal identification number", and "PIN" will be used interchangeably, the first being considered generic.

Also, in this discussion, the term "transaction" will mean that activity for which a credit account is established to promote, e.g. the completion of a bank transaction through an ATM, the successful line connection between a calling party and the called party, or the unlocking of a door to a protected structure such as a building or automobile.

For convenience, this description will presume that a standard telephone keypad is used in which alphabetic symbols are grouped and distributed along the numeric keys 0–9. Also, the keypad is assumed to have pound sign (#) and asterisk or star sign (*) keys.

Finally, again for convenience, the term "digit" is used in describing the alphanumeric characters that comprise the account information data or the access code. Thus, even though "digit" suggests numerals, it is to be understood that any alphanumeric character, ASCII character, or the like may be substituted for the term "digit".

Telephone fraud has become a $500 Million Dollar a year revenue loss which is primarily paid for, albeit indirectly, by the credit card user. In the last year, in addition to phone credit card theft, other problems in this area have emerged, such as unauthorized access into direct dialing, PBX remote access, Voice Mail exchange fraud, and the like.

In the Visa and MasterCard and Department Store credit card industries, the dollar losses are commensurate. This industry has felt escalated losses of six billion dollars. To date, there is no reprieve in sight, and no countermeasures appear to be forthcoming to relieve these serious crimes. The bulk of the crimes come from the use of credit cards or credit card numbers that are stolen by the people through whose hands a credit card, or credit card number, passes, or by a person who observes someone making use of account information and a user identification code such as at a public telephone. It is not unusual for a credit card or credit card number to pass through a thousand hands per year.

Security of credit account systems has been improved in the last several years by the use of personal identification numbers (PINs). Although any of the aforementioned types of credit accounts could be used in this discussion to exemplify prior attempts to improve the security of such systems, the telephone credit card or "calling card" will be used as exemplary. In the use of such credit card, as mentioned above, the caller will enter the telephone number to be charged to his or her account. The system will then respond with a prompt for entry of the PIN. The PIN is a 4-digit number which is then compared against a stored 4-digit number in the computer of the phone company, and if a match is made between the entered PIN and the stored PIN, completion of the call will be made, and the cost for the call will be charged against the account recognized by the computer as being associated with the entered user phone number. Of course, there is always a possibility that an incorrect digit will be entered by the user, and for that reason, the phone company repeats the request for entry of an appropriate PIN, and if a successful match is made on the second or subsequent time, the call will be completed. After a certain number of attempted tries without success, any further attempts to enter a PIN will be rejected, even if a match would have otherwise been made. The termination of accepting inputted PINs after a certain number of failures is to prevent "hackers" from inputting a large number of PINs at random in order to attempt to gain access to the account by a fortuitous match.

A similar system is employed by many banks in their automatic teller machine apparatus. Again, a user is prompted, after inserting his or her credit card (or other bank account) into a slot, for a PIN, and upon a proper match, access to the account is made.

The problem with both of these described systems is that it is not too difficult for one to gain access to an account by looking over the shoulder of a user inputting numbers on a keyboard which is usually mounted on a vertical panel and is easily seen by one who is serious about gaining access to an account. Of course, an automatic teller machine would require reading of the physical card prior to the user entering the PIN, but telephone credit card account information and its access code can be obtained by an unauthorized user simply by observing the digits being inputted and memorizing them or writing them down for future reference. A more violent thief might steal a "calling card" or rob its owner of such card after the thief learns the access code or PIN.

Other systems, such as PBX systems, can be tampered with at night when no one is in the facility by a computer hacker who can quickly attempt thousands of tries to access the system in a short period of time so as to gain access to an outgoing line to place local or long distance telephone calls from within the PBX system by remote control of the hacker.

All of these systems, even those with which a PIN is required in order to complete the full identification of the user and give access to the system, have similar problems. When a thief enters the exact duplication of the access code a legitimate user has previously entered, he (the thief) is rewarded and encouraged to try it again with another credit account. Further, once the access code (including the PIN) for a particular account is known, the unauthorized user can repeatedly use the account over and over until such time as he or she is caught, decides to move on to another account, or exhausts the credit limit of the legitimate owner of the account.

Some solutions that have been proposed to reduce these crimes include the following: make access codes longer, thus complicating the problem of discovering them; cancel the codes of employees once they leave a company; train personnel to recognize the signs of rip-off schemes; block all calls to countries in which the company has no dealings; monitor calling on a daily basis; increase hired security personnel to guard protected structures; and the like. All have failed to make a significant reduction in such crimes.

It would therefore be an improvement in this industry to provide a method and apparatus for frustrating or eliminating the ability for an unauthorized user to gain access to a protected structure or credit account. The present invention provides a method and apparatus for improving such security and in some cases completely eliminating the possibility of fraudulent access.

It has been estimated that the present invention can decrease telephone fraud by at least 90%, immediately after the program is implemented. Some of the features and benefits of the present invention are: reduction in budget, e.g., reduction in cost for fraud related problems, reduction in size of credit card fraud department at credit card company, reduce computer access time attributed to fraud users, and reduce sales staffs time to be taken up by fraud inquiries; no additional hardware, e.e., no costly expense to install special hardware to implement the invention; utilizes existing credit card standards, i.e. no need to change, replace, or add digits to the existing system codes or account numbers; totally adaptable, i.e. the invention can be applied to any credit card system or computer system dependable on security codes; and each call or transaction is 100% unrelated to the other, keeping the card number in a constant check.

SUMMARY OF THE INVENTION

This invention provides an improvement in account access security by eliminating the possibility that repeating an exact access code which was successful in accessing the account will be unsuccessful at the next or subsequent tries. That is, even if the code was learned by an unauthorized user observing a successful transaction, the subsequent duplication of that exact same access code would result in failure to access the account. This is made possible by entering the user PIN code in accordance with a prescribed, but variable, sequence, the sequence being different for each transaction from the previous transaction.

In the broadest aspect of the invention, the user inputs the PIN by entering a sequence of alphanumeric symbols in accordance with a prescribed "start" sequence of symbols for recognition as a proper 4-digit PIN for a first transaction. The system, upon recognizing the correct PIN will give the user access to the account. At the same time, the system increments at least one of the digits of the stored PIN for that account so that, in effect, the user must enter a new PIN to access the same account on subsequent tries. Preferably, and in the simplest form of the invention, the sequence of alphanumeric symbols comprising the PIN has only one symbol different from the "start" sequence for recognition as a proper PIN for a second transaction. Similarly, the third transaction may require yet a third sequence of alphanumeric symbols comprising a third PIN. As many different PINs as desired can be accommodated within reasonable limits.

To illustrate, when the user is prompted to key in his or her 4-digit unique PIN, he or she will enter the first three digits the same for each transaction. However, the fourth digit will be different for each transaction for a sequence of, for example, four transactions. Of course, the user must remember the different sequences and also must be aware of the previous sequence used in order that he or she can know which is the next sequence to use for the next transaction. This can be remembered very simply by first memorizing the first three digits in the normal way one would memorize his or her 4-digit PIN, and then choose a four letter word to represent the four different symbols that the fourth digit can take on for sequential transaction.

As an example, suppose the user's first three digits of the PIN are 1, 2, and 3. The variable fourth digit can be remembered by memorizing a key word, such as TOBY, representative of the telephone key pad numbers 8, 6, 2, and 9, respectively. Therefore, upon entering the PIN for the first transaction, the user would enter 1, 2, 3, 8 where the first three digits are fixed and the fourth digit is the first digit (8) which represents the first letter (T) of the word TOBY. If, later in the day, the user wishes to make a second transaction, when prompted for his 4-digit PIN, he or she would again enter 1, 2, 3, but this time the fourth digit would be a 6, representing the letter (O) in the word TOBY. This process would continue until the user has made four transactions, at which time he or she would start over again with the letter "T". In this manner, a would be thief who enters the exact keyboard symbols that the user did in successfully accessing his or her account would fail to access the account for having incorrectly entered the fourth digit of the PIN. Without knowing the key word, there would be one chance in nine (the remaining numbers left to try for the fourth digit) that the thief would be able to successfully access the account. Of course, the system can be programmed to make any one of the four digits of the PIN variable, so that, in fact, the thief has one chance in 36 (i.e. 4×9) to be successful, assuming that three of the digits are fixed (a fact that the thief also does not know). If the system were to shut down or reject transactions after the second attempt fails, it is clear that the chances of a thief gaining access to an account in this way would be substantially thwarted.

It is, of course, an object of the invention to not create any great difficulty for the user, and for that reason the example previously given using a single variable digit would be preferable. However, if the user so desires, or in usage situations where tighter security is called for, two of the digits could be made variable raising the number of possible PIN combinations to one hundred. Taking this to an extreme, there would be a possibility of ten thousand variations of PINs if all four digits were made variable. This would require the user to remember four different 4-digit numbers, however, and their sequence. Obviously, the system according to the invention is sufficiently flexible to accommodate a variety of levels of security upon an election of the number of digits to be made variable.

The number of characters in the key word is arbitrary. To keep matters simple, it is recommended that the key word be four characters long, such as the example TOBY given above. After the user has accessed the account four times, i.e. entering the characters T, 0, B, and Y in sequence for four separate transactions, the user merely starts over in the sequence by again entering T and continuing to cycle through the characters T, 0, B, Y, so that there is a limitless number of times the account can be accessed using only a few character key word.

To further simplify the operation, the system can preferably have a reset function which will automatically reset the key word to its beginning letter at midnight each night so that the user need only remember a 4-digit PIN, the same as he or she would without incorporating the present invention. That is, when only a single transaction per day or less is to be made by a user, he or she needs remember no more than with a standard 4-digit PIN in systems without incorporating the present invention. It is only when the user wishes to make a second transaction in the same 24-hour period that he or she will have to remember the key word and modify the fourth (or other) digit in accordance therewith. Thus, the reset function prevents the user from having to remember, from one day (or longer) to the next, the last character used in the last transaction concluded.

In another aspect of the invention, instead of entering one of the letters of the key word (TOBY), in the event that the user is in distress or an emergency exists, he or she could enter a special character, for example, H (keypad number 4) for help, as the fourth digit of the 4-digit PIN. At the telephone company, the special code could be deciphered, and a message sent to security or the police department in order to render help for the user. This would be useful where a user is being forced at gunpoint to enter an account number or is otherwise in distress.

The use of a 4-digit PIN is arbitrary. Obviously, the invention is not limited to the use of a 4-digit PIN and encompasses a system in which a single digit PIN is used. In such a system the user would enter, and the system would respond to, a T for the first transaction, an 0 for the second, a B for the third, a Y for the fourth, a T for the fifth, and so on. This would be a good approach when using standard credit (VISA or MASTER CARD) cards, as will be explained later in connection with FIG. 2.

BRIEF DESCRIPTION OF THE DRAWING

The invention will now be further described in connection with the accompanying drawings in which.

DETAILED DESCRIPTION OF THE PREFERRED EMBODIMENT

Figure 1:
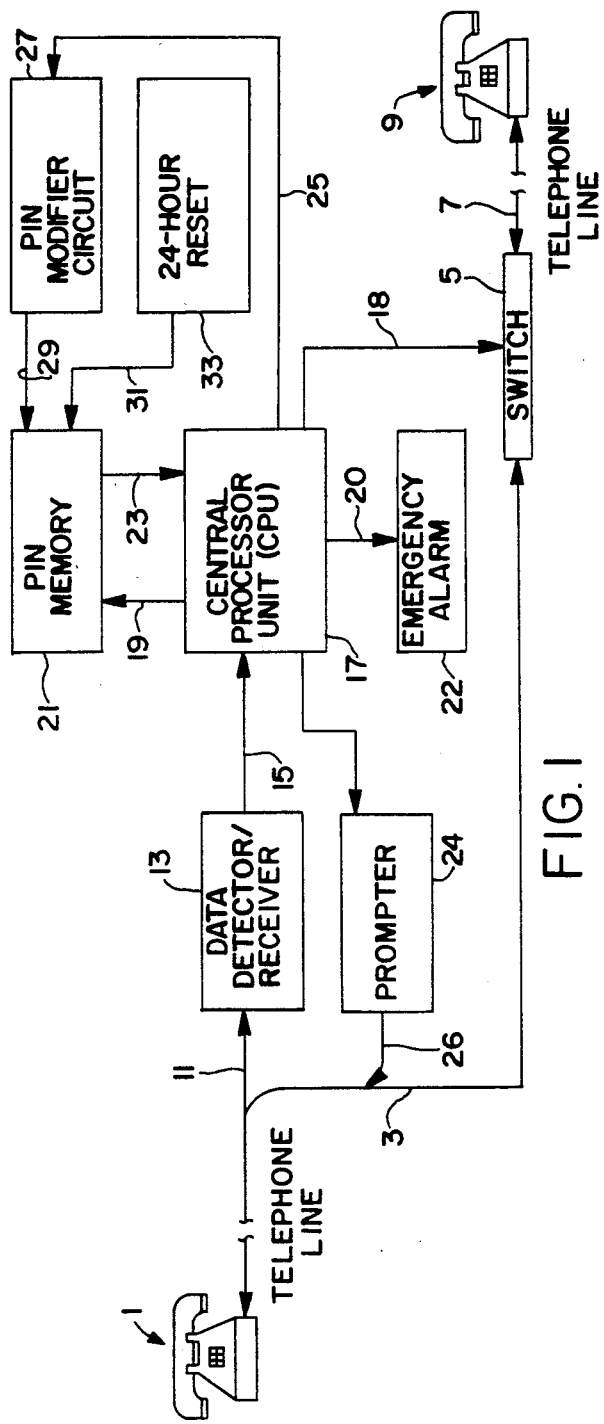
FIG. 1 is a block diagram of a system incorporating the basic blocks of the present invention.

The basic system employing the invention is shown in FIG. 1, where a telephone system is illustrated as exemplary of the concepts according to the invention. It will be understood that, instead of a telephone system, a credit card system, an automatic bank teller card system, and the like, could be used employing the same concepts of the invention without deviating from the spirit and scope of the invention.

In FIG. 1, a telephone 1 is connected across a telephone line 3, through a line switch 5 to a remote telephone 9 connected by a telephone line 7. Except for the switch 5, this would be a typical connection over the telephone lines through the telephone company, whereby one party using telephone 1 can place a call and speak to another party using telephone 9. Of course, the telephone company monitors all such calls for time usage and proper switching for monthly accounting purposes. Since such an arrangement is part of the known prior art, it is not shown in the figure.

The line switch 5 interrupts the telephone transmission along line 3 unless and until switch 5 is enabled. Enabling will result from the following operation.

The user of telephone 1 will dial in the number of telephone 9 to be called and either manually, by keyboard, or automatically, by credit card reader, enter his or her account information which will be used to charge the caller of phone 1 for the time used. For that purpose, a data detector/receiver 13 receives and separates the data on telephone line 11, which is tapped off of the main transmission line 3, and produces the digital representation of the user's account information (account number) on line 15. The data on line 15 is coupled to a central processor unit (CPU) 17 which interrogates PIN memory 21 where all of the PIN numbers are stored. When the proper PIN number is selected from the PIN memory 21 which relates to the entered account information data, the PIN number will be transmitted to CPU 17 by way of line 23. A prompter function 24 in the telephone equipment then prompts the user via line 26 to input the 4-digit access code (PIN). The CPU 17 then compares the entered 4-digit PIN code from line 15 with the stored PIN code on line 23. If a match is made, an enable signal is outputted on line 18 to enable switch 5 and allow the communication between telephone 1 and telephone 9 in the ordinary fashion.

The preceding would describe the operation of a standard telephone credit card system, where access is given upon the proper inputting of a 4-digit PIN. The inventive concepts according to the present invention are incorporated in the additional functions of blocks 27 and 33 in FIG. 1. For purposes of illustration, functional blocks 24, 27, and 33 are shown as standard hardware circuit blocks. The functions of these blocks may, alternately and preferably, be performed by the CPU 17 with appropriate programming software.

When the 4-digit PIN is retrieved from PIN memory 21 and outputted on line 23 to the CPU 17, and CPU 17 determines that a proper match has been made, this event also signals increment circuit 27 via line 25 that a successful match has been made. Block 27 (modify PIN Function) then sends a signal on line 29 to alter the stored PIN in PIN memory 21 for that same user, preferably by altering the last digit as previously described. This can be done by software controlling CPU 17, which basically incorporates a recycling shift register where the positions of the shift register shift sequentially and repeatedly through, for example, the numerals 8, 6, 2, and 9 (for T, O, B, and Y). Such shift registers commonly have an input resettable to a "start" or "clear" condition, in this case to set the fourth digit of the PIN to an 8 (first letter of the key word TOBY). When a user wishes to access the same account after entering the correct "start" PIN, he or she must use a different PIN comprising the incremented 4-digit PIN to access the account. In other words, when the account information is received on line 15, the CPU 17 interrogates PIN memory 21 for a 4-digit user identification code, but this time and incremented user identification code is applied along line 23 to the CPU 17. Thus if the would input the same 4-digit PIN he or she previously used, the CPU 17 would not enable the switch 5 on line 18. However, with the incremented stored PIN matching the incremented inputted PIN, an enable signal on line 18 does make the connection at switch 5 and the call is completed.

If a user is in an emergency situation, he or she may enter a special digit for the fourth digit of the access code. The CPU 17 is programmed to recognize this and outputs a special digit recognition signal on line 20 to enable an emergency alarm 22 which may be an audible alarm a visual alarm, or a message on a computer screen.

Figure 2:
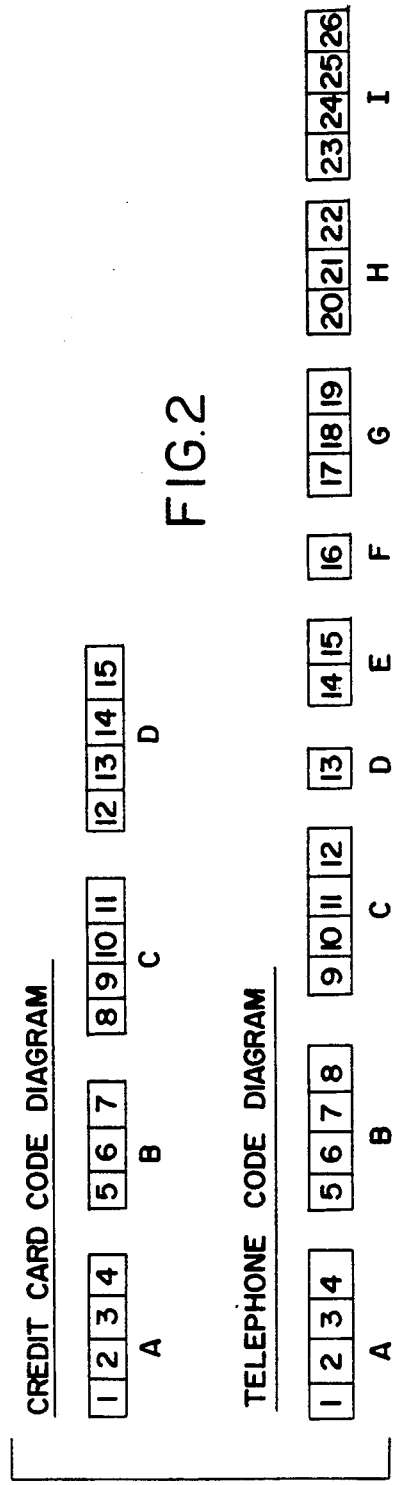
FIG. 2 shows the code diagram for the separate digits of the account information and user access code for a typical credit card and telephone calling card.

FIG. 2 shows two diagrams of the groupings of digits in a credit card code and in a telephone code. The telephone code will be used as an example. After dialing a 0 and the telephone number of phone 9, the user either slides his or her card in the slot of a card reader or manually inputs digits 1–12 shown in FIG. 2 as sections A–C. Section A identifies the long distance carrier to be used. Sections B an C are user account identifiers, typically the caller's area code and phone number. Section G is the area code of the phone being called (phone 9). Section H is the prefix for the telephone number being called, and Section I is the telephone number itself. After entry of digits 1–12 comprising the user account information, the user inputs manually, on the telephone keypad, the digits 13–16 which are shown grouped as a 4-digit group K comprising separate individual groups D, E and F. As explained earlier, the first three digits 13–15, or groups D and E, can remain the same for all transactions involving the use of the telephone card. Only digit 16 will change transaction to transaction within the same twenty-four hour period. As explained earlier, for example, when the user inputs digits 13, 14, and 15, he or she may enter the numerals 1, 2, and 3 (or any other desired but fixed combination). Then, for the fourth digit, digit 16, the user would input an 8 (for the first letter "T" of the word TOBY). On the second transaction, after the increment circuit 27 (FIG. 1) increments the PIN in memory 21, the user must enter the incremented 4-digit code to have a second access to the account. In such a case, the user would input the numerals 1, 2, 3, and 6. The sequence would continue, repeating the letters T, O, B, Y until midnight, at which time the telephone company apparatus, which includes twenty-four hour reset circuit 33 (FIG. 1), would output a pulse on line 31 to reset the PIN memory for the exemplary account back to the first sequence, i.e., 1, 2, 3, 8.

As mentioned, if desired, any of the four digits could be made variable, or more than one digit can be incremented to increase the number of possibilities for key words and render the system more secure, at the expense of the user having to memorize additional key words.

In addition to the possible usage of digits 14 and 15 as variable digits, digit 13, the first digit entered by the user, can have a special significance. In the event that the user has both a business account and a personal account, the thirteenth digit can be entered either as a 7 or a 2. The numeral 7 corresponds to the telephone key pad containing the letter P for personal, while the key pad 2 contains the letter B for business.

For credit account usage, it is common practice that the last number 15 (FIG. 2) or last section merely records a card number. That is, the account number is contained in sections A–C of the credit card code. Accordingly, the software of a standard credit card accounting system could be easily modified to require the user (or vendor clerk, such as a grocery store checkout person) to enter the sequencing PIN the same as was described in connection with a telephone credit card. In such an arrangement, no new hardware is required and only minor software changes need be made at the credit card company, or bank as the case may be.

The invention will now be described in connection with FIG. 3 which is shown in three parts, 3a, 3b, and 3c.

Figure 3A:
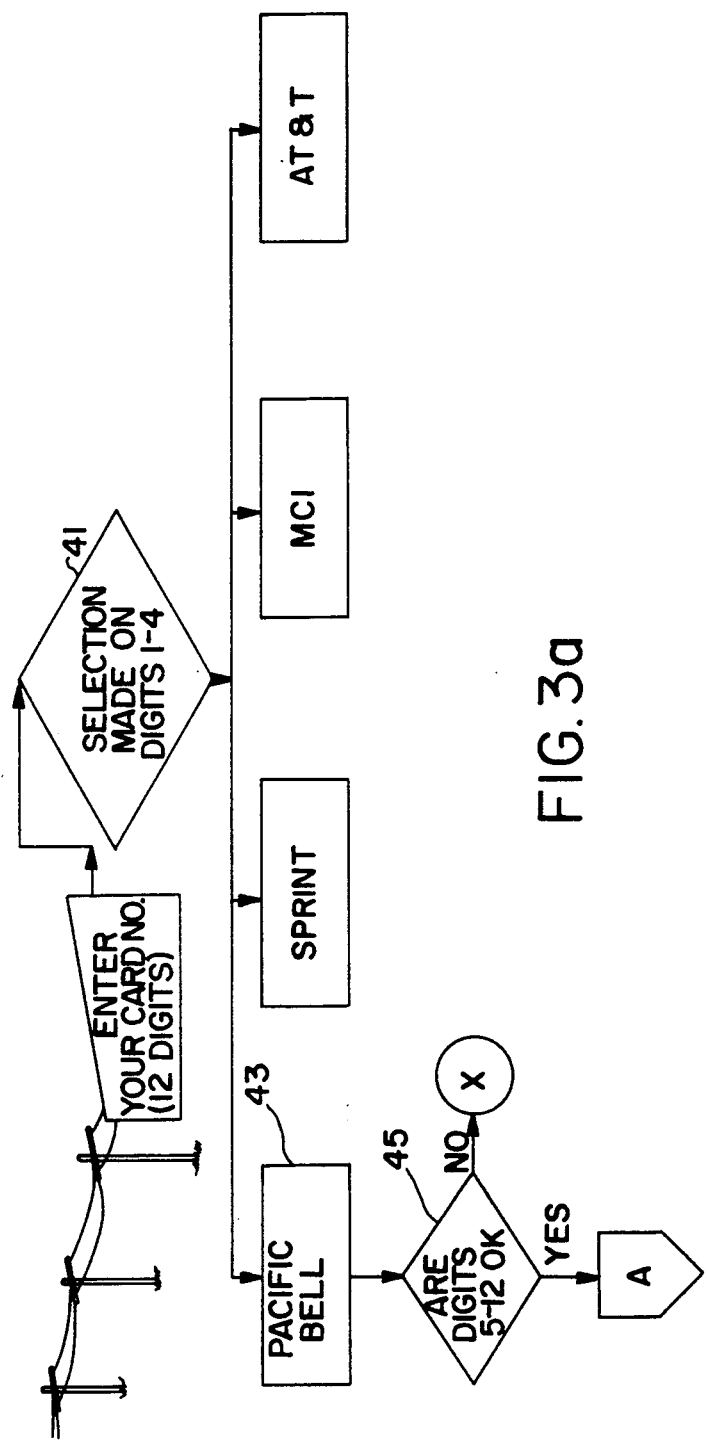
FIG. 3a-3c makeup a flow diagram showing the steps in the method for successfully and unsuccessfully accessing the credit account in accordance with the invention.

With reference to FIG. 3a, a user enters his or her card number either manually by use of a telephone keypad, or automatically by a card reader. The first eight digits contain account information, and when prompted, four additional numbers (PINs) are manually inputted by the user by the telephone key pad.

The first four digits of the inputted account information identify and send the signal to the appropriate long distance carrier. For local area calling, the carrier is automatically engaged, since the caller has a choice of carriers only for long distance calling. Assuming, for purposes of this discussion, that Pacific Bell has been identified, the functions of the invention, especially those of the central processor are as follows.

Figure 3B:
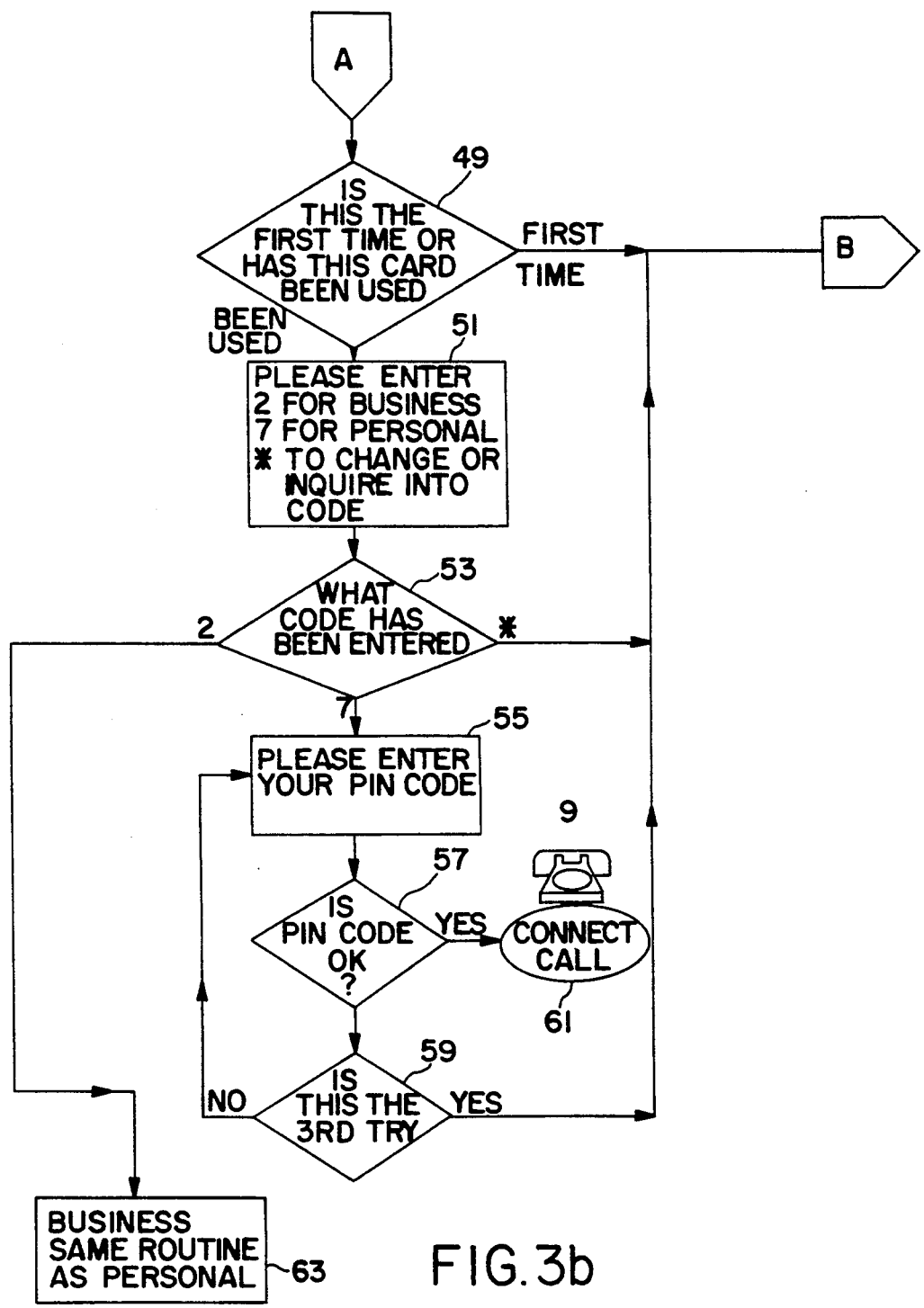
Figure 3C:
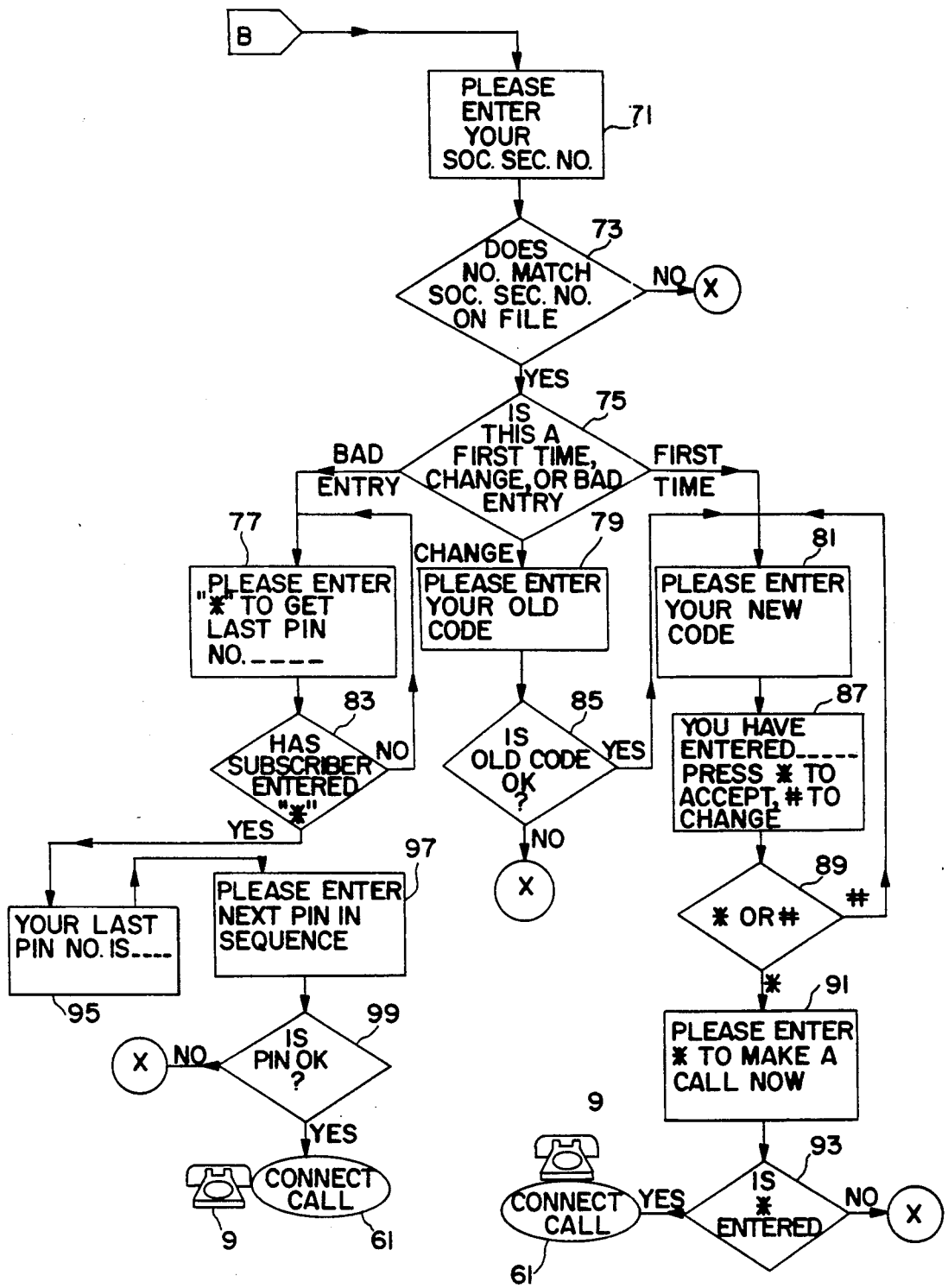

In the diagram of FIGS. 3a–3c, a rectangle represents a system request, a diamond represents a system decision, a circled X represents a disconnect, an asterisk represents the pushing of the * key on a telephone key board pad, and a pound symbol represents the pushing of the # key on the telephone pad.

After the carrier, Pacific Bell, is selected at block 43, the system makes a decision as to whether or not digits 5–12 of the account information are okay in block 45. This means that the system has checked for a valid reading of the card and/or that the manually inputted data in fact represents an account with the telephone company. If the answer is No, the telephone line is disconnected. If the answer is Yes, i.e., all digits 5–12 are okay, a Yes decision is sent to block 49 (FIG. 3b) in which the decision is made as to whether this is the first time the card has been used or whether the card has been used before. If this is not the first time the card has been used, a No decision is sent to block 51 which prompts the user to input either a 2 for business, a 7 for personal usage, or a * to change or inquire into the code. The 2 or 7 leads ultimately to a connection to the called line, or to a rejection of the request if a successful PIN match cannot be made. The * result will be discussed later and is used when the caller needs information about his or her account.

Assuming that a decision in block 53 is a 7 (P for personal usage), the system requests additional input by the user at block 55 for his or her 4-digit PIN (user identification) code. That code is interpreted in the system decision block 57 as to whether or not the PIN code is okay, i.e., whether or not there is a match between the stored PIN and the entered PIN for the account. If Yes, then a call connect in block 61 connects the user to the telephone line reaching to the called party on telephone 9.

If the PIN code is not okay in block 57, a decision is made in block 59 as to whether or not this is the third try for a correct PIN code. If it is only the first or second try, the answer to the decision question in block 59 is No and the user is prompted to again enter his or her PIN code in block 55 and the process cycles until, at the third try, the output of decision block 59 is a Yes. At that time, the system assumes that either the user is not authorized or has forgotten his or her code. If the user selected a business transaction in block 53, i.e. a 2 was pressed as the first digit of the 4-digit PIN, a similar routine as carried out upon selecting a 7, as just described, would result as indicated in block 63.

In any case, the Yes decision from block 59 as well as the asterisk from block 53 or the Yes decision from block 49 results in the user being prompted in block 71 (FIG. 3c) which asks the user to enter his or her social security number. The system then makes a decision in block 73 as to whether or not the social security number on file for the account matches the social security number inputted by the user. If No, the telephone line is disconnected. If Yes, the system makes a decision as to whether or not this is a first time, change, or bad entry from the information contained in blocks 49, 53, and 59, respectively. If this is a first time usage for the card, the system prompts the user for a new 4-digit code to be entered at block 81. Upon receiving the four digits, the system confirms the number by repeating the entered digits and prompts the user to press an asterisk to accept or a pound sign to change the entry.

Block 89 is an OR decision block where, if a pound sign is entered by the user, indicating a desire to change the PIN code, he or she is again prompted at block 81 to enter a new code. Once the user accepts the entered PIN code, the user is prompted to press the asterisk key on the telephone keypad at block 91 in order to make a call instantly. If an asterisk is entered, block 93 recognizes that decision and makes the connection at block 61 to enable transmission to and from the remote telephone line. If the decision in block 93 is No, the line is disconnected.

A user could have reason to change the key word, especially if he or she feels that the old key word may have fallen into unauthorized hands, or the key word could be changed on a regular basis, e.g. every 30 days, just to keep the PIN codes fresh. In such a case, a decision from block 75 causes block 79 to prompt the user to enter his or her old code. If the old code is correct, i.e. it matches the stored PIN code, the decision in block 85 enables the system to prompt the user for the new code in block 81 as described previously. If the old code does not match the stored code, the decision in block 85 will lead to a No decision and thereby disconnect the telephone line.

If the user has been unsuccessful in three tries to enter his or her appropriate PIN, the output of block 59 (FIG. 3b) will be a Yes decision which is recognized by the system in block 75 as a "bad entry". The bad entry decision activates block 77 which prompts the user to enter an asterisk to get the last PIN number, this, of course, being possible only if the social security number is matched in block 71. This feature of the invention is important when the user is unable to remember the last variable code used in the variable code sequence so as to be able to access his or her account for the second or subsequent time in the same 24 hour period. By making three attempts and having the system not respond for three times, the user finds himself with this prompt noted in block 77. If the user has not entered an asterisk in response to the prompt in block 77, a No decision from block 83 asks the user to enter an asterisk again to get the last PIN number. When the user enters an asterisk, the Yes decision from block 83 advises the user what his or her last PIN number was in block 95. The user then uses that information to enter the next PIN in sequence as prompted by block 97. The computer then pairs the newly entered PIN with the stored PIN reference. If a match is made, the decision block 99 is enabled to connect the user in block 61 to the remote telephone line. If the user again fails to match the "next PIN in sequence", a No decision from block 99 disconnects the telephone line.

The invention has been described with specific reference to a particular preferred embodiment of the invention representing the best mode known to the applicant. It should be obvious to one skilled in the art that several variations of the described invention can be made without departing from the spirit and scope of the invention. For example, totally independent of a credit account situation, a 4-digit (or multi-digit) code with one or more digits varying in accordance with a key word, as described herein, could be beneficially used. Hotels or Corporations with digital keypad entry schemes could employ the basic concepts of the invention. Similarly, the new door keypads for automobile security could employ the invention to keep a bystander from observing an inputted code and trying the same code (unsuccessfully) after the owner departs. Accordingly, the invention is not to be limited by the preceding description, but rather by the appended claims.

I claim:

1. A method of controlling access to a credit account employing a system of the type which requires entry of an account information data block and a proper access code in order to conduct and conclude a transaction, the system having storage means for storing a plurality of access codes, each stored access code being uniquely associated with an account information data block, said method comprising the steps of:
   (a) initiating a first transaction upon receiving a user entered account information data block for identifying a user account to be accessed in said first transaction;
   (b) selecting a first stored access code responsive to entry of, and corresponding to, said account information data block;
   (c) receiving a first user entered access code;
   (d) comparing said selected first stored access code with said user entered access code, and, upon a match therebetween, enabling access to said credit account for successfully conducting and concluding said first transaction;
   (e) disabling access to said credit account after said first transaction is concluded;
   (f) replacing said first access code stored in said storage means wit a second access code different from said first access code;

(g) initiating a second transaction upon receiving said user entered account information data block a second time for identifying said user account to be accessed in said second transaction;

(h) selecting said second access code responsive to entry of, and corresponding to, said account information data block;

(i) receiving a second user entered access code;

(j) comparing said selected second access code with said second user entered access code, and, upon a match therebetween, enabling access to said credit account for successfully conducting and concluding said second transaction; and (k) disabling access to said credit account after said second transaction is concluded; wherein:

said replacing step includes the step of altering at least part of said selected first stored access code to define said second access code;

said access codes each include a plurality of digits; and said altering step includes altering at least one of the digits of said stored first access code in accordance with a prescribed pattern from transaction to transaction.

2. The method as claimed in claim 1, wherein said access codes each include a plurality of digits and whereni said altering step includes altering a plurality of digits comprising said stored first access code in accordance with a prescribed pattern from transaction to transaction.

3. The method as claimed in claim 2, wherein said method includes the steps of:

receiving a user entered special digit in place of said at least one digit, said special digit being predetermined and not one of said digits in accordance with said pattern, whereby the entry of said special digit signifies an emergency situation for the user; and issuing an emergency signal upon detecting that the special digit has been entered by the user.

4. The method as claimed in claim 1, wherein successfully conducting and concluding each transaction requires said at least one digit to change according to said prescribed pattern for all transactions completed within a twenty-four period, and wherein, after such twenty-four hour period, successfully conducting and concluding the next transaction requires entry of said first access code, following which the cycle of changing said access code in accordance with said prescribed pattern is repeated during a subsequent twenty-four hour period.

5. The method as claimed in claim 1, wherein said method includes the steps of resetting said stored access code to its original unaltered condition at prescribed time intervals.

6. The method as claimed in claim 1, including the steps of:

(l) replacing the current access code with a further access code different from said current access code;

(m) receiving said user entered account information data block a further time for identifying said user account in a further transaction;

(n) selecting said further access code responsive to entry of, and corresponding to, said account information data block;

(o) receiving a further user entered access code; and (p) comparing said further access code with said further user entered access code, and, upon a match therebetween, enabling access to said credit account for successfully conducting and concluding said further transaction.

7. The method as claimed in claim 6, including repeating steps (l) through (p) a prescribed number of times.

8. A method of controlling access to a protected unit employing a system of the type which requires entry of a proper access code in order to disable a protective device denying access to the unit and permit a user to gain access to the unit, the system having storage means for storing a plurality of access codes, each stored access code being uniquely associated with an individual user, said method comprising the steps of:

(a) selecting a first stored access code from said plurality of stored access codes;

(b) receiving a first user entered access code;

(c) comparing said selected first stored access code with said user entered access code, and, upon a match therebetween, disabling said protective device to give access to said protected unit;

(d) enabling said protective device to again deny access to said protected unit;

(e) replacing said first access code stored in said storage means with a second access code different from said first access code;

(f) selecting said second access code;

(g) receiving a second user entered access code; and (h) comparing said selected second access code with said second user entered access code, and, upon a match therebetween, disabling said protective device; wherein:

said replacing step includes the step of altering at least part of said selected first stored access code to define said second access code; and said altering step includes altering at least one of the digits of said stored first access code in accordance with a prescribed pattern from each attempt to gain access to the protected unit to the next attempt.

9. The method as claimed in claim 8, wherein said altering step includes altering a plurality of digits comprising said stored first access code in accordance with a prescribed pattern from each attempt to gain access to the protected unit to the next attempt.

10. The method as claimed in claim 9, wherein said method includes the steps of:

receiving a user entered special digit in place of said at least one digit, said special digit being predetermined and not one of said digits in accordance with said pattern, whereby the entry of said special digit signifies an emergency situation of the user; and issuing an emergency signal upon detecting that the special digit has been entered by the user.

11. The method as claimed in claim 8, wherein successfully gaining access to the protect unit requires said at least one digit to change according to said prescribed pattern for all attempts to gain access completed within a twenty-four period, and wherein, after such twenty-four hour period, successfully gaining access requires entry of said first access code, following which the cycle of changing said access code in accordance with said prescribed pattern is repeated.

12. The method as claimed in claim 8, wherein said method includes the step of resetting said stored access code to its original unaltered condition at prescribed time intervals.

13. The method as claimed in claim 8, including the steps of:

(i) replacing the current access code with a further access code different from said current access code;

(j) selecting said further access code;

(k) receiving a further user entered access code; and (l) comparing said further access code with said further user entered access code, and, upon a match therebetween, disabling said protective device.

14. The method as claimed in claim 13, including repeating steps (i) through (l) a prescribed number of times.

15. An apparatus for controlling to a credit account, said apparatus being of the type which has means for recognizing valid entry of an account information data block and a proper access code in order to permit a user to conduct an conclude a transaction, the system including control means for alternately denying and authorizing access to an account, memory means for storing a plurality of access codes, each stored access code being uniquely associated with an individual user, said apparatus comprising:

means for receiving a user entered account information data block and identifying a user account in a first transaction and for receiving user entered access codes;

means for selecting a first stored access code from said memory means responsive to entry of, and corresponding to, said account information data block;

means for comparing said selected first stored access code from said memory means with a user entered access code from said receiving means, and, upon a match therebetween, generating an access authorized signal routed to said control means for authorizing access to said account; and means for replacing said first access code with a second access code different from said first access code; and wherein:

in a second transaction, said comparing means compares said second access code with a second user entered access code from said receiving means, and, upon a match therebetween, generates an access authorization signal routed to said control means for authorizing access to said account;

said means for replacing includes means for altering at least part of said selected first stored access code to define said second access code; and said altering means includes means for altering at least one of the digits of said stored first access code in accordance with a prescribed pattern from transaction to transaction.

16. The apparatus as claimed in claim 15, wherein said altering means includes means for altering a plurality of digits comprising said stored first access code in accordance with a prescribed pattern from transaction to transaction.

17. The apparatus as claimed in claim 15, comprising:

means for detecting receipt of a user entered special digit in place of said at least one digit, said special digit being predetermined and not one of said digits in accordance with said pattern, whereby the entry of said special digit signifies an emergency situation for the user; and means for issuing an emergency signal upon detecting that the special digit has been entered by the user.

18. The apparatus as claimed in claim 15, comprising means for resetting said stored access code to its original unaltered condition at prescribed time intervals.

19. An apparatus for controlling access to a protected unit, said apparatus being of the type which has means for recognizing valid entry of a proper access code in order to disable a protective device and permit a user to gain access to the unit, the system including control means for alternately denying and authorizing access to said unit, memory means for storing a plurality of access codes, each stored access code being uniquely associated with an individual user, said apparatus comprising:

means for receiving user entered access codes;

means for selecting a first stored access code from said memory means;

means for comparing said selected first stored access code from said memory means with a user entered access code from said receiving means, and, upon a match therebetween, generating an access authorized signal routed to said control means for disabling said protective device;

means for replacing said first access code with a second access code different from said first access code; and wherein, in a second transaction, said comparing means compares said second access code with a second user entered access code from said receiving means, and, upon a match therebetween, generates an access authorization signal routed to said control means for disabling said protective device; wherein said means for replacing includes means for altering at least part of said selected first stored access code to define said second access code; and said means for altering includes means for altering at least one of the digits of said stored first access code in accordance with a prescribed pattern from each attempt to gain access to the protected unit to the next attempt.

* * * * *